US011526895B2

(12) United States Patent
Lewis et al.

(10) Patent No.: US 11,526,895 B2
(45) Date of Patent: Dec. 13, 2022

(54) METHOD AND SYSTEM FOR IMPLEMENTING A CRM QUOTE AND ORDER CAPTURE CONTEXT SERVICE

(71) Applicant: ORACLE INTERNATIONAL CORPORATION, Redwood Shores, CA (US)

(72) Inventors: Mark David Lewis, Parker, CO (US); Jianfeng Tai, Foster City, CA (US); David Wang, San Mateo, CA (US); Ying Wang, Foster City, CA (US); Re Lai, Fremont, CA (US)

(73) Assignee: ORACLE INTERNATIONAL CORPORATION

( * ) Notice: Subject to any disclaimer, the term of this patent is extended or adjusted under 35 U.S.C. 154(b) by 359 days.

(21) Appl. No.: 16/266,337

(22) Filed: Feb. 4, 2019

(65) Prior Publication Data

US 2019/0172068 A1 Jun. 6, 2019

Related U.S. Application Data

(63) Continuation of application No. 14/015,577, filed on Aug. 30, 2013, now Pat. No. 10,223,697.

(60) Provisional application No. 61/780,464, filed on Mar. 13, 2013, provisional application No. 61/694,930, filed on Aug. 30, 2012.

(51) Int. Cl.
*G06Q 30/00* (2012.01)
(52) U.S. Cl.
CPC .................................. *G06Q 30/01* (2013.01)
(58) Field of Classification Search
CPC ..................................................... G06Q 30/01
See application file for complete search history.

(56) References Cited

U.S. PATENT DOCUMENTS

| 6,557,012 B1 | 4/2003 | Arun |
| 7,712,042 B2 | 5/2010 | Hernandez-Sherrington |
| 7,730,032 B2 | 6/2010 | Idicula |
| 7,913,161 B2 | 3/2011 | Rivas, Jr |
| 8,230,326 B2 | 7/2012 | Albornoz |
| 8,326,869 B2 | 12/2012 | Kolluri et al. |
| 8,555,157 B1 | 10/2013 | Fu |
| 8,862,991 B2 | 10/2014 | Harrington |
| 2001/0032209 A1 | 10/2001 | Duxbury |
| 2003/0115547 A1 | 6/2003 | Ohwada |
| 2003/0120579 A1 | 6/2003 | Carter, III |
| 2005/0125781 A1 | 6/2005 | Swamy et al. |

(Continued)

FOREIGN PATENT DOCUMENTS

WO    WO 2006/047407    5/2006

OTHER PUBLICATIONS

C. Weijie et al., "A Context-Aware Services Development Model," 2012 International Joint Conference on Service Sciences, 2012, pp. 194-199, doi: 10.1109/IJCSS.2012.35 (Year: 2012).*

(Continued)

*Primary Examiner* — Michelle T Kringen
(74) *Attorney, Agent, or Firm* — Vista IP Law Group, LLP

(57) ABSTRACT

Disclosed is an improved approach for implementing enterprise software systems that addresses the above-described problems with existing systems. The present approach provides an effective and efficient way for defining schemas for services, and to define how to map the schema to particular transactional contexts.

27 Claims, 12 Drawing Sheets

(56) References Cited

U.S. PATENT DOCUMENTS

| | | | |
|---|---|---|---|
| 2005/0177436 A1 | 8/2005 | Menninger | |
| 2006/0122914 A1 | 6/2006 | Moroney | |
| 2007/0050407 A1 | 3/2007 | Swamy | |
| 2007/0192362 A1* | 8/2007 | Caballero | G06Q 10/06 |
| 2007/0226196 A1 | 9/2007 | Adya | |
| 2007/0230488 A1 | 10/2007 | Yu | |
| 2007/0239742 A1 | 10/2007 | Saha | |
| 2008/0034282 A1 | 2/2008 | Zemik | |
| 2008/0082572 A1 | 4/2008 | Ballard | |
| 2008/0097934 A1 | 4/2008 | Carter, III | |
| 2008/0133618 A1 | 6/2008 | Kawabe | |
| 2008/0134025 A1 | 6/2008 | Harada | |
| 2008/0208714 A1 | 8/2008 | Sundaresan | |
| 2008/0208732 A1 | 8/2008 | Guttman | |
| 2008/0235260 A1 | 9/2008 | Han | |
| 2008/0275907 A1 | 11/2008 | Han | |
| 2010/0088314 A1* | 4/2010 | Kuang | G06F 16/951 707/733 |
| 2010/0095129 A1 | 4/2010 | Wilson | |
| 2010/0100427 A1* | 4/2010 | McKeown | G06Q 10/1057 705/322 |
| 2010/0275152 A1 | 10/2010 | Atkins | |
| 2010/0293234 A1 | 11/2010 | Schmidt | |
| 2011/0029634 A1 | 2/2011 | Gimson | |
| 2011/0153505 A1* | 6/2011 | Brunswig | G06Q 10/103 705/301 |
| 2011/0231576 A1 | 9/2011 | Blaszczak | |
| 2013/0018849 A1 | 1/2013 | Johnston | |
| 2013/0036352 A1 | 2/2013 | Hui | |
| 2013/0124474 A1 | 5/2013 | Anderson | |
| 2013/0275363 A1* | 10/2013 | Wu | G06F 9/46 707/602 |
| 2014/0012882 A1 | 1/2014 | Poppitz | |

OTHER PUBLICATIONS

"PeopleSoft Enterprise Catalog Management," Oracle PeopleSoft Enterprise, Dec. 2002 (13 pages).
Non-final Office Action dated Mar. 19, 2015 for U.S. Appl. No. 14/015,560.
Non-final Office Action dated Jul. 16, 2015 for U.S. Appl. No. 14/015,553.
Final Office Action dated Oct. 8, 2015 for related U.S. Appl. No. 14/015,560.
Non-final Office Action dated May 31, 2016 for related U.S. Appl. No. 14/015,546.
Non-final Office Action dated Aug. 26, 2016 for related U.S. Appl. No. 14/015,560.
Final Office Action dated Dec. 15, 2016 for related U.S. Appl. No. 14/015,546.
Non-final Office Action dated Mar. 10, 2017 for related U.S. Appl. No. 14/015,560.
Non-final Office Action dated Jun. 21, 2017 for related U.S. Patent No. U.S. Appl. No. 14/015,546.
Notice of Allowance and Fee(s) Due dated Nov. 3, 2017 for related U.S. Appl. No. 14/015,560.
Notice of Allowance and Fee(s) Due dated Dec. 4, 2017 for related U.S. Appl. No. 14/015,546.
Wong, Eugene. Dynamic Rematerialization: Processing Distributed Queries Using Redundant Data. IEEE Transactions on Software Engineering, vol. SE-9, No. 3, May 1983. pp. 228-232. (Year 1983).
Non-Final Office Action dated Sep. 1, 2016 for related U.S. Appl. No. 14/015,577.
Final Office Action dated Mar. 10, 2017 for related U.S. Appl. No. 14/015,577.
Non-Final Office Action dated Oct. 24, 2017 for related U.S. Appl. No. 14/015,577.
Advisory Action dated Aug. 10, 2018 for related U.S. Appl. No. 14/015,577.
Notice of Allowance and Fee(s) dated Oct. 5, 2018 for related U.S. Appl. No. 14/015,577.
Ardissono, Liliana, et al. "A Framework for the Development of Personalized, Distributed Web-Based Configuration Systems" Ai Magazine 24.3, year 2003.
Notice of Allowance and Fee(s) Due dated Feb. 10, 2016 for related U.S. Appl. No. 14/015,553.
Final Office Action dated May 18, 2018 for related U.S. Appl. No. 14/015,577.
Notice of Allowance dated Oct. 5, 2018 for related U.S. Appl. No. 14/015,577.
Ardissono, Liliana, et al. "A framework for the development of personalized, distributed web-based configuration systems." Ai Magazine 24.3 (2003): 93. (Year: 2003).

* cited by examiner

FIG. 7

METHOD AND SYSTEM FOR IMPLEMENTING A CRM QUOTE AND ORDER CAPTURE CONTEXT SERVICE

CROSS-REFERENCE TO RELATED APPLICATIONS

The present application is a continuation of U.S. patent application Ser. No. 14/015,577, filed on Aug. 30, 2013, entitled "METHOD AND SYSTEM FOR IMPLEMENTING A CRM QUOTE AND ORDER CAPTURE CONTEXT SERVICE", which (1) claims the benefit of priority to U.S. Provisional Application No. 61/694,930, filed on Aug. 30, 2012, entitled "METHOD AND SYSTEM FOR IMPLEMENTING A CRM QUOTE AND ORDER CAPTURE CONTEXT SERVICE" and U.S. Provisional Application No. 61/780,464, filed on Mar. 13, 2013, entitled "METHOD AND SYSTEM FOR IMPLEMENTING A CRM QUOTE AND ORDER CAPTURE CONTEXT SERVICE", and (2) is related to U.S. Pat. No. 9,372,842, entitled "METHOD AND SYSTEM FOR IMPLEMENTING VERSIONS OF A SALES CATALOG", U.S. Pat. No. 9,922,303, entitled "METHOD AND SYSTEM FOR IMPLEMENTING PRODUCT GROUP MAPPINGS", and U.S. Pat. No. 9,953,353, entitled "METHOD AND SYSTEM FOR IMPLEMENTING AN ARCHITECTURE FOR A SALES CATALOG", all hereby incorporated by reference in their entirety.

BACKGROUND

The present application relates to software development and more specifically to systems, methods, and patterns for implementing enterprise software applications.

Many types of business logic are implemented by enterprise software applications. For example, CRM (Customer Relationship Management) applications often implement business logic to perform price quotations and order capture for customers. For the price quotation business logic, a pricing engine may be implemented to receive input data (e.g., product name or product ID) and to return output data that includes the price for each product in the input data. For the order capture business logic, an order capture engine and/or eligibility engine may be used to receive input data regarding a potential order (e.g., customer ID and product ID) and provide output data regarding the order capture or order eligibility.

The problem that is often faced by users of such systems is that these enterprise software systems do not come with a standard configuration that exactly meets the user's requirements. This means that the out-of-the-box performance of the system does not provide the most optimal, useful or effective configuration for the user. Given the complexity of these systems, it is normally very difficult, if not impossible, for most users to be able to configure the system to meet the user's requirements.

For at least the above reasons, there is a need for improved approaches to implement enterprise software systems and applications.

SUMMARY

Embodiments of the invention provide an improved approach for implementing enterprise software systems that addresses the above-described problems with existing systems. The present invention provides an effective and efficient approach for defining schemas for services, and to define how to map the schema to particular transactional contexts.

Other and additional objects, features, and advantages of the invention are described in the detailed description, figures, and claims.

BRIEF DESCRIPTION OF FIGURES

FIG. 7 illustrates an example interface for defining consumers of the canonical schema.

DETAILED DESCRIPTION

The embodiments of the invention provide an improved approach for implementing enterprise software systems that addresses the above-described problems with existing systems. The present invention provides an effective and efficient approach for defining schemas for services, and to define how to map the schema to particular transactional contexts.

Figure 1A:
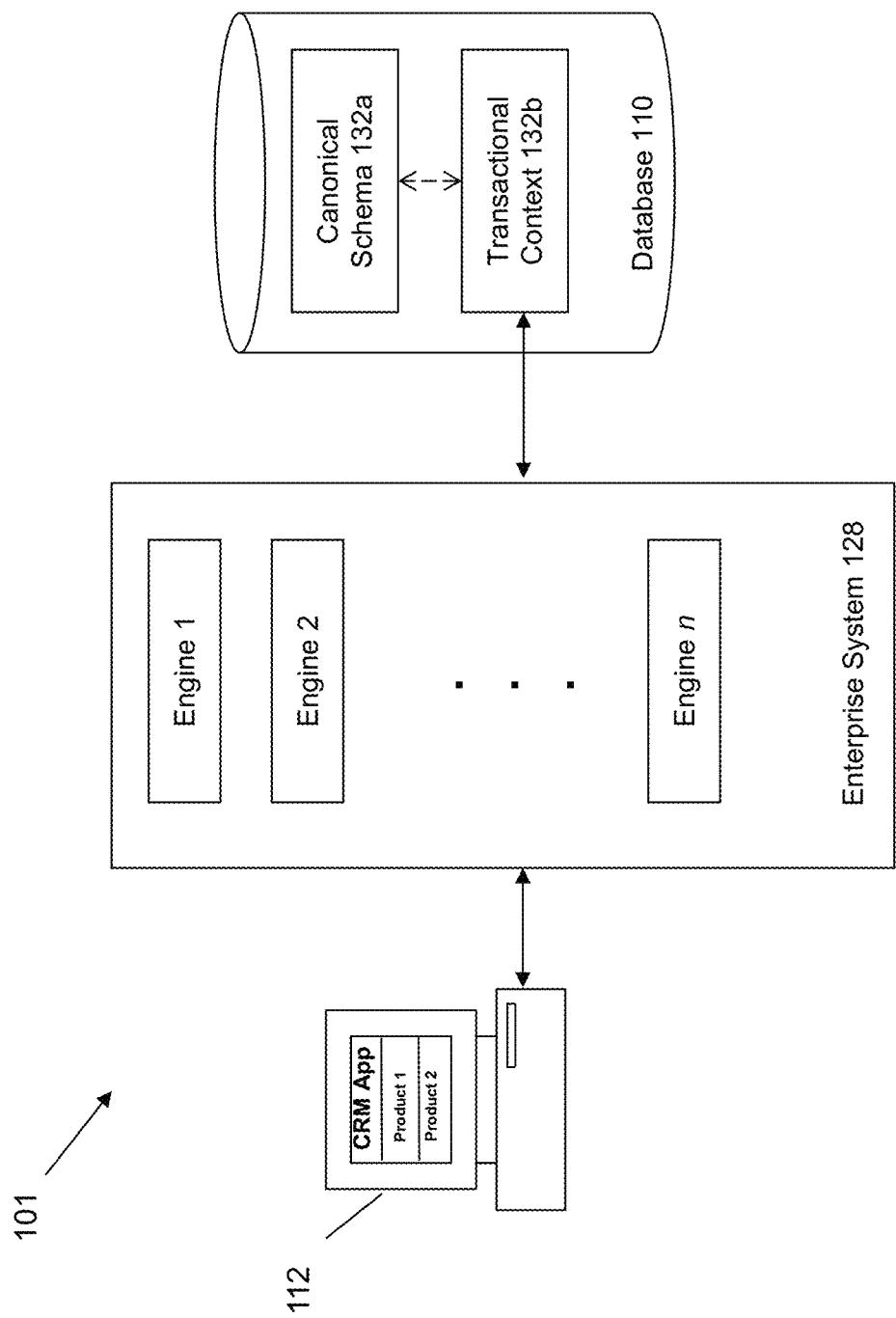
FIG. 1A shows an architecture of a system for implementing some embodiments of the invention.

FIG. 1A shows an architecture of a system 101 for populating and/or mapping the canonical schema to a real transactional context according to some embodiments of the invention. System 101 may include one or more users at one or more user stations 112. The users operate the system 101 to access and utilize applications on an enterprise application system 128 to perform any activities operable using the system 128, such as implementing the functionality of a CRM enterprise application.

In system 101, user station 112 comprises any type of computing station that may be used to operate or interface with a system 128. Examples of such user stations 112 include for example, workstations, personal computers, laptop computers, or remote computing terminals. User stations 112 may also comprise any type of portable tablet device, including for example, tablet computers, portable readers, etc. User stations 112 may also include mobile telephone devices relating to any mobile device that can suitably access an application on application system 128, such as smartphones and programmable mobile handsets. It is noted that the invention is not limited in its application to just these types of devices. The embodiments of the invention are applicable to any computing device that works in conjunction with an enterprise application.

The user station 112 comprises a display device, such as a display monitor or screen, for displaying scheduling data and interface elements to users. The user station 112 may also comprise one or more input devices for the user to provide operational control over the activities of system 100, such as a mouse, touch screen, keypad, or keyboard. The users of user station 112 correspond to any individual, organization, or other entity that uses system 101 to access applications on application system 128, such as a CRM enterprise application. Other examples of enterprise applications can include, e.g., supply chain management ("SCM") applications that manage raw materials, work-in-process and/or finished products, and coordinate with suppliers; relationship management applications that are used to track, store and/or manage customer information; financial applications that track and/or analyze the financial performance of the organization; human resources applications that provide management of the human resources functions of the organization, and other applications. In some cases, these applications are standalone applications; in other cases, a single business application or suite of applications might provide some or all such functionality. Specific, non-limiting examples of enterprise applications include JD Edwards Enterprise One, PeopleSoft Enterprise applications, and the Oracle eBusiness Suite, all available from Oracle Corporation of Redwood Shores, Calif.

The data accessed or created by the enterprise application can be stored in a database 110. The database 110 corresponds to any type of computer readable mediums or storage devices. The computer readable storage devices comprise any combination of hardware and software that allows for ready access to the data within database 110. For example, the computer readable storage device could be implemented as computer memory or disk drives operatively managed by an operating system.

As noted above, the enterprise system 128 may implement various types of business logic, such as a CRM application that implement business logic to perform price quotations and order capture for customers. Various processing engines 1, 2, . . . n may be employed by the enterprise system 128 to implement the business logic. For example, for the price quotation business logic, a pricing engine may be implemented to receive input data (e.g., product name or product ID) and to return output data that includes the price for each product in the input data. For the order capture business logic, an order capture engine and/or eligibility engine may be used to receive input data regarding a potential order (e.g., customer ID and product ID) and provide output data regarding the order capture or order eligibility. Co-pending U.S. Ser. No. 14/015546, entitled "METHOD AND SYSTEM FOR IMPLEMENTING AN ARCHITECTURE FOR A SALES CATALOG", discloses one possible approach to integrate multiple processing engines for an enterprise application, and is hereby incorporated by reference in their entirety.

The embodiments of the present invention provide an effective and efficient approach to configure the enterprise system 128 to meet any specified requirements to work with these various engines. In particular, a canonical schema 132*a* is defined for the system, where the canonical schema comprises business objects applicable for the usage of the processing engines. The canonical schema is mapped to a given transaction context 132*b*, where the mapping allows one to specifically designate how the canonical schema may be applied to a context.

In this way, the invention solves the problem that is often faced by users of conventional systems, by allowing custom configuration of the system to meet user's exact requirements. This provides a significant advantage over conventional systems that do not come with a standard configuration that exactly meets the user's requirements. In effect, this allow the invention to provide the most optimal, useful and/or effective configuration, as specified by users of the system.

Figure 1B:
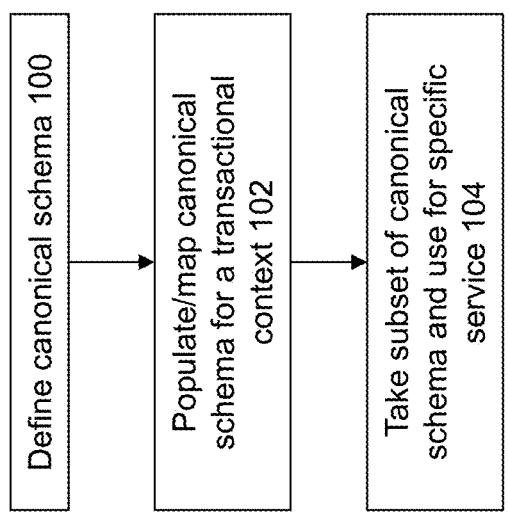
FIG. 1B shows a flowchart of an embodiment of the invention.

FIG. 1B shows a flowchart of an embodiment of the invention. At 100, a canonical schema is defined for the system. The canonical schema includes a set of business objects of general applicability for the usage to which the enterprise application is directed. The canonical schema pertains to all active entities for which it is desired to map to a set of one or more business logic engines.

At 102, the inventive approach populates and/or maps the canonical schema to a real transactional context. As described in more detail below, a user interface can be provided to allow a user to perform this type of mapping activity. In effect, the user uses a user interface to define a layer of abstraction over the canonical schema. At 104, the subset of the canonical schema is used as the input/output of the service.

In operation, a call is received at a system from the user. The mappings are reviewed, and any necessary queries and/or web services are executed to build the appropriate document as the input to the business logic engine. The business logic engine will process the input data and will then return an updated version of the document that includes the desired information. That output document is used by the mapping engine to process the output, where the appropriate queries and/or web service calls are used to provide the desired output.

The invention can be applied to provide context services for any scenarios involving an enterprise application. For example, the invention is applicable to provide context services to implement a sales catalog that interfaces with multiple external engines (e.g., pricing engine or eligibility engine), where data is exchanged within the engine(s) to operate engine functionality to provide data for the sales catalog. An example architecture that can be employed to use the context service to implement a sales catalog is described in co-pending U.S. Pat. No. 9,953,353, entitled "METHOD AND SYSTEM FOR IMPLEMENTING AN ARCHITECTURE FOR A SALES CATALOG", which is hereby incorporated by reference in its entirety.

Illustrative Example

This portion of the disclosure will now describe an illustrative embodiment of the invention in the context of a quote and order capture system. It is noted that this illustrative example is being provided for explanatory purposes, but is not intended to limit the scope of the invention to only quote and order capture systems. Indeed, as would be readily understood by one of ordinary skill in the art, the present invention is applicable to other types of enterprise software systems as well.

The quote and order capture process is usually significantly configured to match the business requirements and processes of a customer. It is important that the software is architected using declarative objects and implemented using best practices both of which will help to ensure a lower cost of implementation and compatible upgrades to future releases.

This document describes the infrastructural features that can be delivered on top of an enterprise application (e.g., the middleware stack for the Fusion product available from Oracle Corporation) to support soft-coding of processes and rules.

The design of the present approach represents a significant departure from the traditional approach to building order capture applications. The present order capture application is a next generation approach that is much more flexible, functional and easier to implement than any predecessors or conventional approaches.

The context service provides a mechanism for configuring the schema that various engines operate upon without requiring coding. This lowers the cost of implementation for users and makes it possible to implement certain business practices that would otherwise be impossible in the software. This is especially important for processes that vary greatly between customers such as pricing.

The context service works with a user context to provide the inputs to various services (e.g., pricing engine, eligibility engine, configurator mechanism) and then persists the outputs of the consuming service back to the user context. This enables the services to be created independent of the calling context. The context service consists of at least two features: (a) an administration user interface (UI) and schema where the meta-schema for the consuming service and contextual mappings are defined; and (b) a high performance run-time service to process the mappings.

Figure 2:
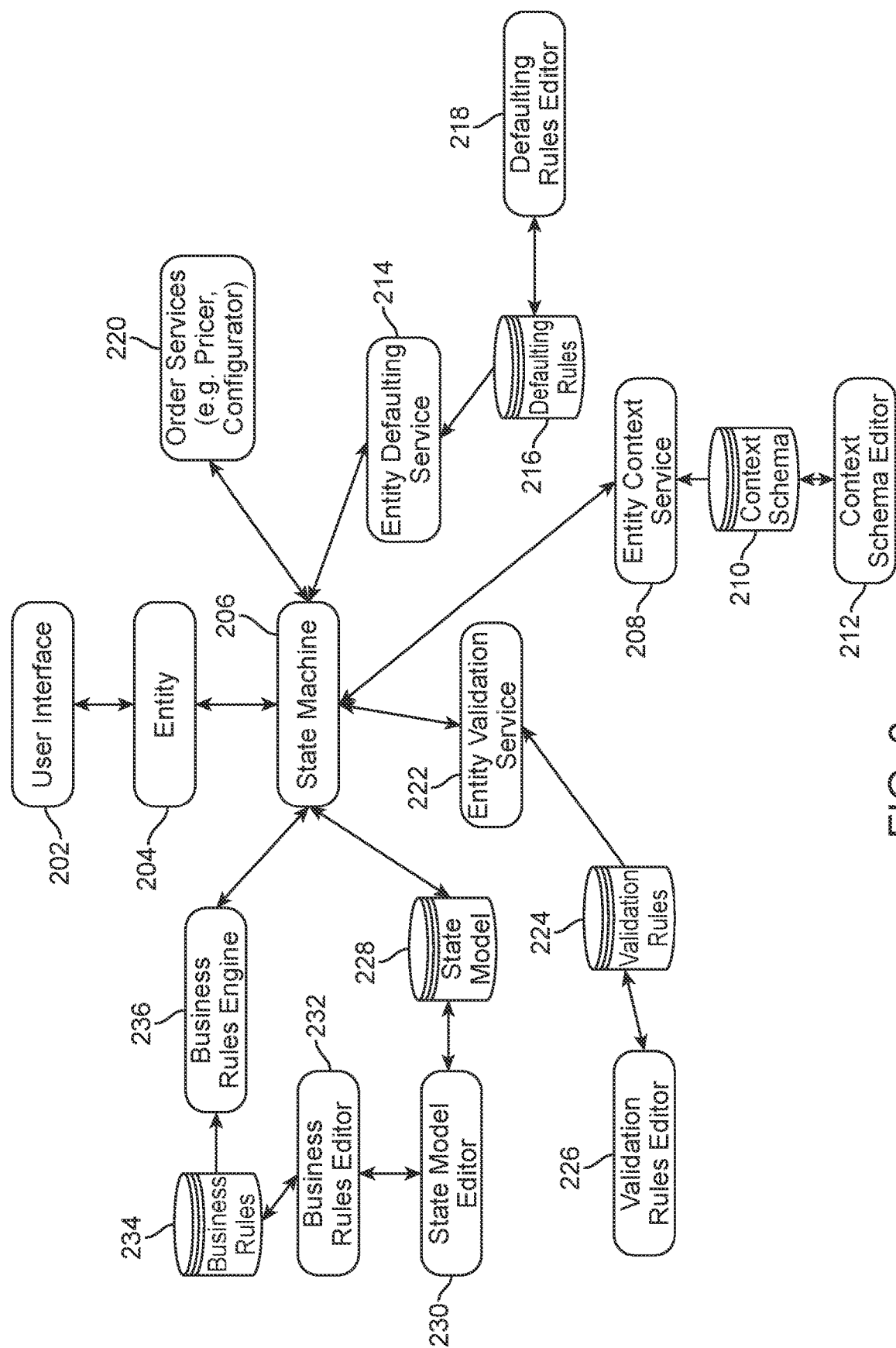
FIG. 2 is a flow diagram according to certain embodiments of the invention.

FIG. 2 is a flow diagram according to certain embodiments of the invention. Users operate the enterprise system architecture using a user interface 202. The architecture includes a state machine 206 that functions as an event handler for the system. The state machine 206 operates to detect and handle an event that occurs in the system pertaining to an entity 204.

As used herein, the "entity" pertains to a declarative representation of the necessary pieces of the schema required for a given context, where the context comprises a container under which a context provider, context consumer, and entity are built. In the CRM/pricing context, examples of an entity include an order entity or an opportunity entity. The context consumer pertains to a service that requests the schema which is passed in the form of a Structured Data Object (SDO), which can be implemented as a memory resident object that represents the underlying schema. The SDO may be accessed in whole or in part by a context consumer. The context provider can be implemented as a declarative mapping of the underlying business object schema (typically a "view object" or "VO") that provides the structured data to the context consumer. The view object comprises an object that is employed by the system to hold data for access/viewing by the system.

The architecture employs a context schema editor 212 to configure a context schema 210 to enable an entity context service 208. The context schema editor 212 provides a mechanism for configuring the schema 210 that various engines operate upon without coding. The context service 208 can be understood, for example, as a declarative means of mapping underlying meta schema to consuming services without the use of any software code. This alleviates the need to have every consumer be responsible for retrieving the schema required to perform a unit of work and thereby increases the efficiency of the application.

This approach makes it possible to implement certain business practices that would otherwise be impossible in the software. The context service implementations will use the current user context to provide the inputs to various services and then persist the outputs of the consuming service back to the user context. This enables the services to be created independent of the calling context.

The state machine 206 may perform validation upon an entity 204 using an entity validation service 222. This service 222 is employed, for example, to make sure that the correct information exists for a given entity. A set of validation rules 224 is employed by the entity validation service 222. The validation rules 224 comprise rules that run against the objects in the system to perform validation functions. A validation editor 226 may be employed to input, define, and/or configure the validation rules 224.

A state model 228 defines states/stages for objects in the architecture. For example, for a sale order, the states/stages may include a quote phase, order phase, change order phase, and shipment phase. The state model 228 may be input, defined and/or configured by a state model editor 230. For each state, the system defines what happens in each state. For example, a "quote stage" may be defined to add lines to a price quote. These actions may be defined using a set of business rules 234 that are implemented by a business rules engine 236. The business rules 234 may be input, defined and/or configured by a business rules editor 232.

An entity defaulting service 214 is employed to define default values for the entity 204. Defaulting rules 216 are used by the entity defaulting service 214, where the defaulting rules 216 may be input, defined and/or configured by a defaulting rules editor 218.

The inventive architecture is not limited in its scope to only the services shown in FIG. 2. Other and additional services 220 may also be used by the state machine 206, e.g., a pricing service or configurator service.

Figure 3:
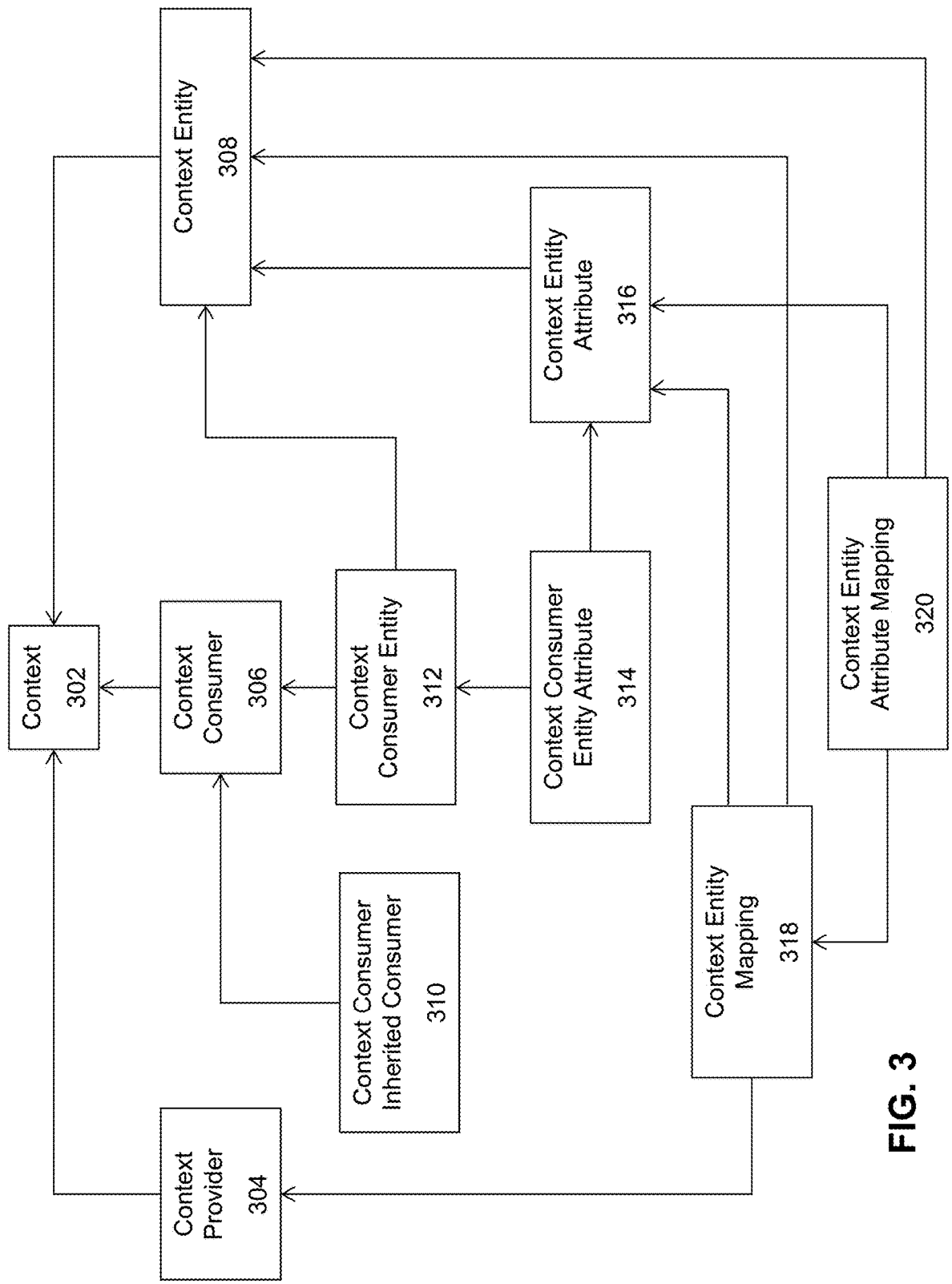
FIG. 3 illustrates a diagram of a logical data model that may be used according to some embodiments of the invention.

FIG. 3 illustrates a diagram of a logical data model that may be used according to some embodiments of the invention. This section describes various business objects that are used in embodiments of the invention. A context 302 represents a high level grouping of entities that can be retrieved and updated by the context service. Examples of a context 302 are "Sales" or "Purchase Order".

The context entity 308 represents an entity that can be retrieved and updated by the context service for a particular context. Examples of a context entity for the "Sales" context are "Transaction Header" and "Transaction Line". The context entity attribute 316 represents an attribute of an entity that can be retrieved and updated by the context service for a particular context. Examples of a context entity attribute 316 for the "Transaction Header" entity in the "Sales" Context are "Price List Id" and "Sold To Customer Id".

The context provider 304 represents a provider in which the context service can be invoked for a particular context. The provider defines the input keys that will be sent to the methods for obtaining a context (e.g., "Get Context" methods). Examples of a context provider 304 for the "Sales" Context are "Order", "Order (Header Only)" and "Order Line".

A context consumer 306 represents a consumer within that uses the context service to retrieve and update data. Examples of a context consumer 306 for the "Sales" context are various services/engines, such as "Pricer", "Product Eligibility" and "Configurator". A context consumer entity 312 identifies a context entity 308 that is used within a context 302 by a consumer to retrieve and update data. For example, the "Pricer" consumer may read and update the "Transaction Line" entity in the "Sales" context. A context consumer entity attribute 314 identifies a context entity attribute 316 that is used within a context 302 by a consumer to retrieve and update data. For example, the "Pricer"

consumer may update the "Net Price" attribute of the "Transaction Line" entity in the "Sales" context.

A context entity mapping 318 defines how a particular entity is queried and updated for a particular context and provider. For example, the "Transaction Header" entity is retrieved and updated via the "Order" View Object for the "Sales" Context and the "Order" provider.

A context entity attribute mapping 320 defines how a particular entity attribute is queried and updated for a particular context and provider. For example, the "Transaction Line Id" attribute of the "Transaction Line" entity is retrieved and updated via the "Order Line Id" attribute of the "Order Line" View Object for the "Sales" Context and the "Order" provider.

In some embodiments, the consumer is not mapped by the context entity mapping 318 or context entity attribute mapping 320. Instead, the consumer is defined by identifying the subset of the canonical schema needed by the consumer. In an alternate embodiment, the consumer can also be mapped using the context entity mapping 318 or context entity attribute mapping 320.

In some embodiments, the context service supports the inheritance of entity and attribute information into a context consumer from other context consumers. This greatly reduces the administrative overhead when defining a change to one particular consumer. For example, whenever the "Product Configurator" is launched in the "Sales" context it requires not only the data required for the product configuration engine, but also the data required to execute "Product Eligibility" and "Pricer". By inheriting the entities and attributes required by these other Consumers, there is no need for dual maintenance when, for example, a change is made to the data used by the "Pricer".

Various user interface implementations may be employed to perform to extend structured data to other services within the CRM application. The UI makes it possible to create, query-by-example, edit or delete a service parameter mapping object. The service parameter mapping objects may use an object versioning mechanism.

Figure 4:
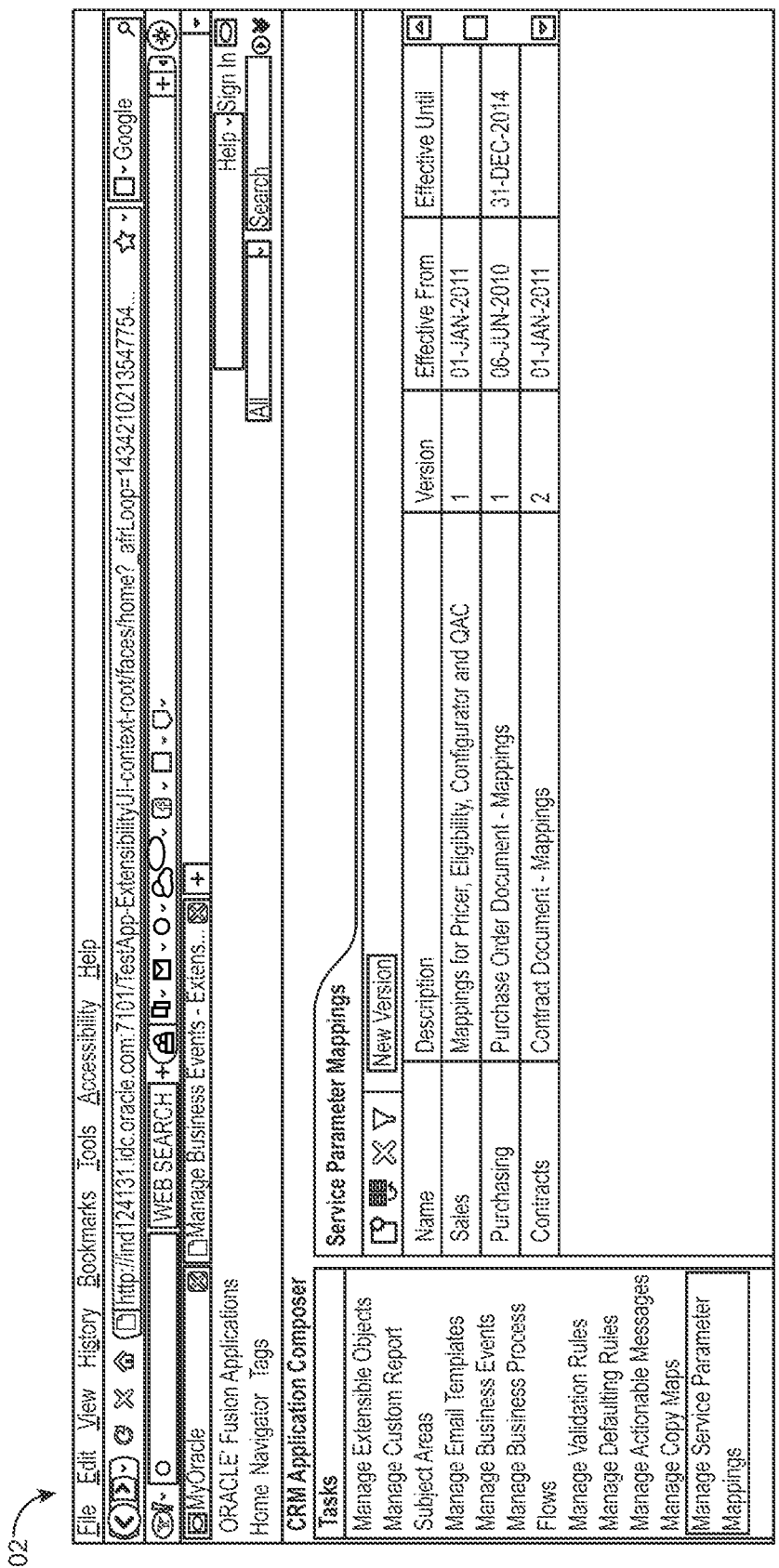
FIG. 4 illustrates a user interface that shows groups of mappings.

FIG. 4 illustrates a user interface 402 that shows groups of mappings. For example, shown are mappings for "Sales", "Purchasing", and "Contracts". In this example, there are three parts to each mapping. One part is for defining "entities", which are canonical and are independent of any particular source, or service. A second part is for defining "sources", which are places, sources, and locations used to populate the canonical. A third part is for "services", which are the consumers of the data from the canonical.

Figure 5:
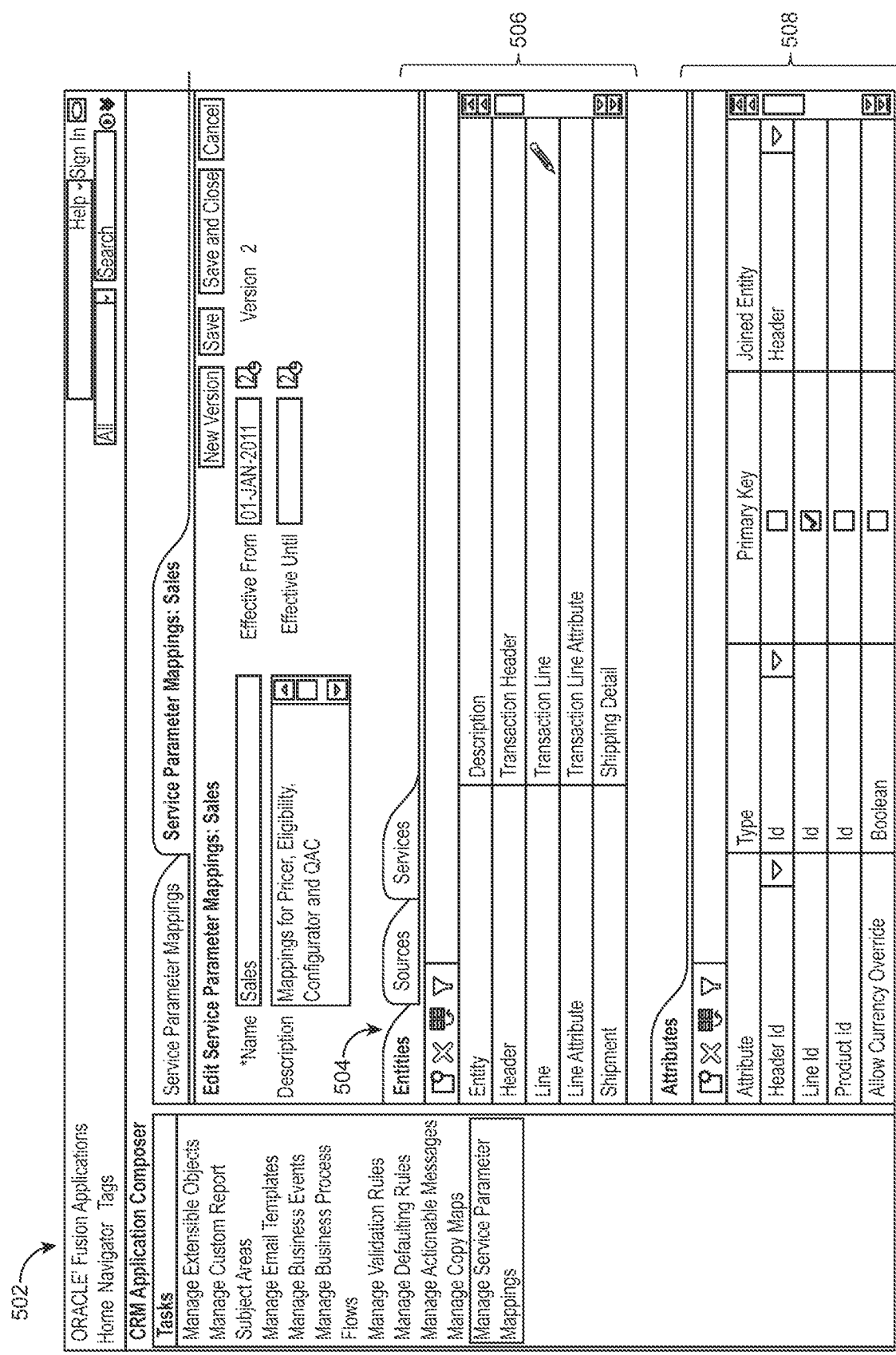
FIG. 5 illustrates an example interface that illustrates drilling down into one of these mappings to manage the service parameter mappings for entities.

It is possible to drill down into the details for each mapping. FIG. 5 illustrates an example interface 502 that illustrates drilling down into one of these mappings to manage the service parameter mappings for entities (as shown using the entities tab 504). Specific entities for the canonical are listed in this interface screen in section 506, such as "header", "line", "line attribute", and "shipment" entities. For each listed entity, the bottom portion 508 of the interface permits selection and set-up of its corresponding attributes and relationships between the attributes for the mappings.

Figure 6:
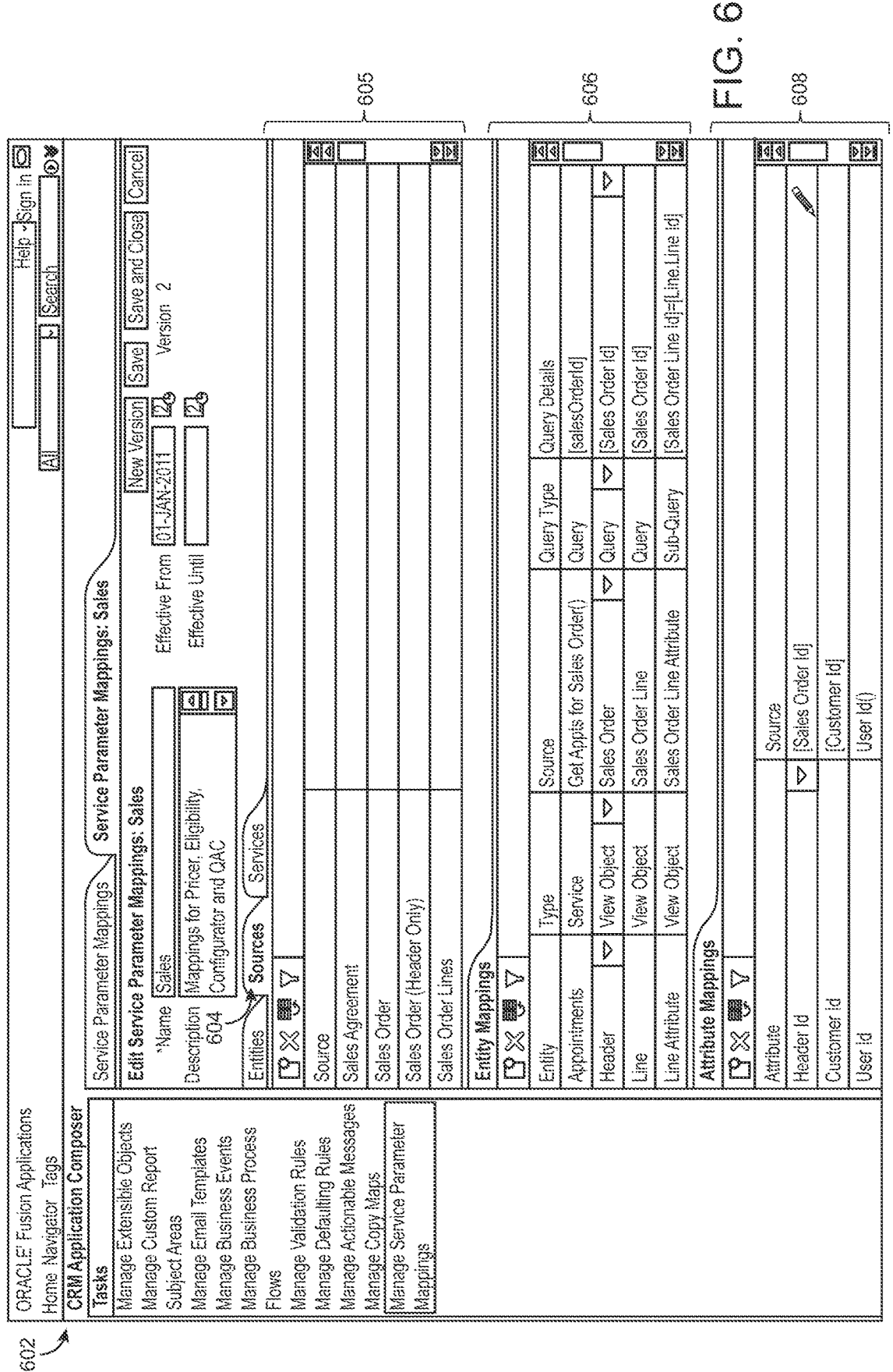
FIG. 6 illustrates an example of an interface to manage service parameter mappings for sources.

FIG. 6 illustrates an example of an interface 602 to manage service parameter mappings for sources (as shown using the sources tab 604). The top portion 605 of the three portions in the interface lists the canonical sources, e.g., a sales agreement, sales order, sales order (header only) and sales order lines. The middle portion 606 is used to configure the entity mappings for a given source. The bottom portion 608 is used to manage attributes and relationships between the attributes. This interface is generally used to configure how to populate the canonical in different situations.

Figure 7:
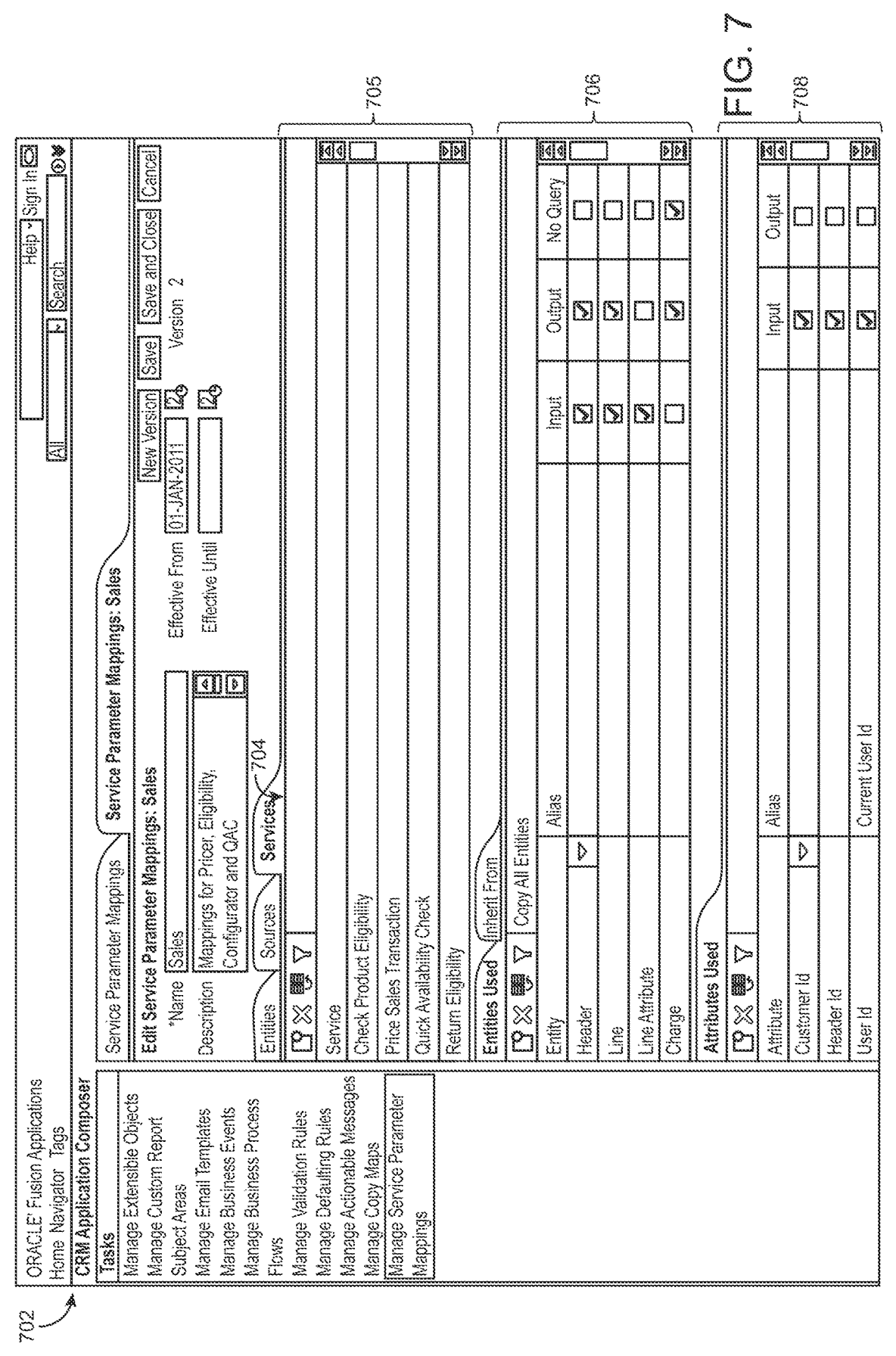
Figure 8:
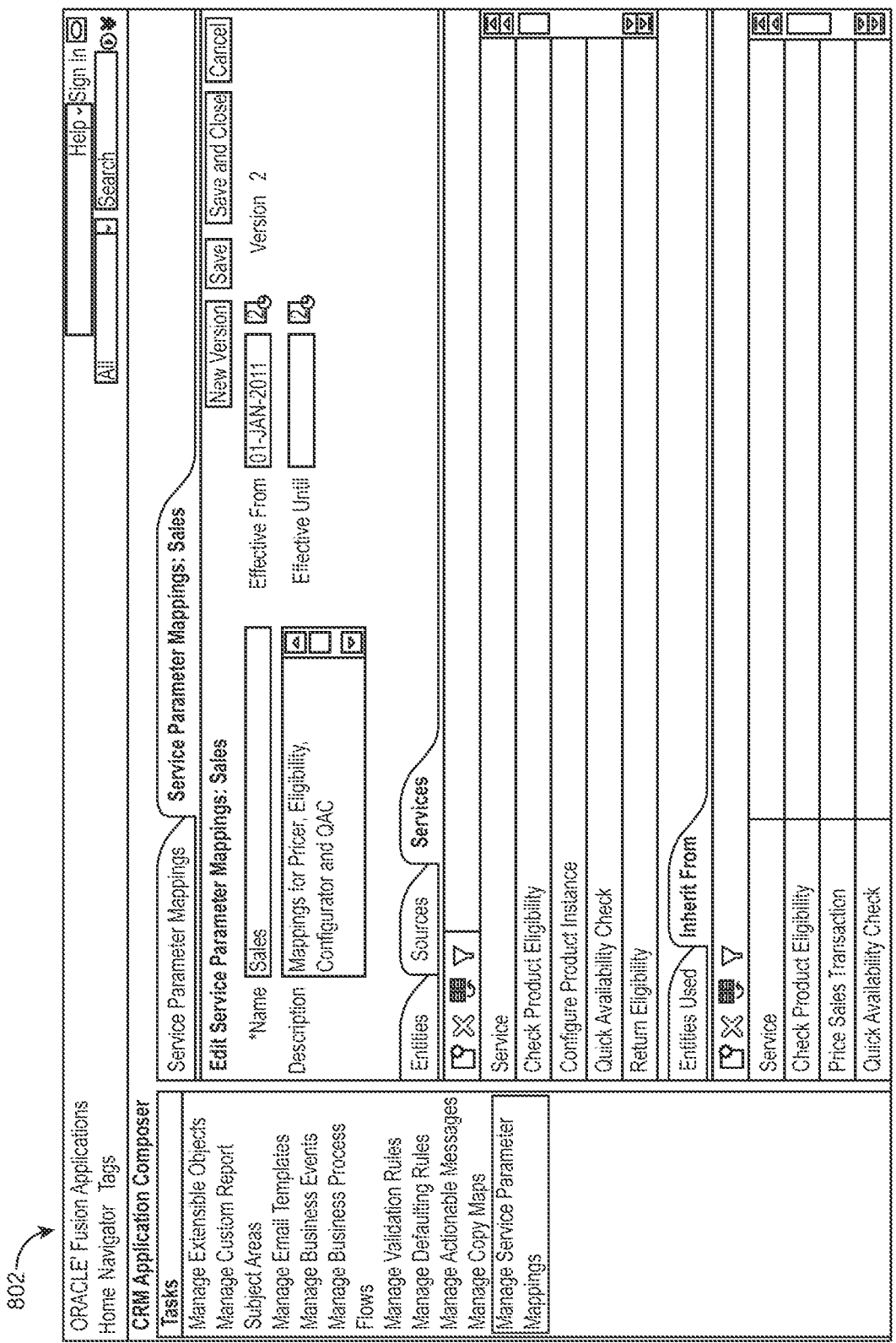
FIG. 8 illustrates another example interface for using an interface to define the services that will be the consumers of the schema.

FIG. 7 illustrates an example interface 702 for defining consumers of the canonical schema, e.g., to identify the services that will be the consumers of the schema (as shown using the services tab 704). The top portion 705 identifies the consumer services to be defined. The middle portion 706 is used to specify the entities pertaining to the service. The bottom portion 708 is used to specify the subset of the attributes to use for the entities and input/outputs. FIG. 8 illustrates another example interface 802 for using the interface to define the services that will be the consumers of the schema.

Context Service

The Context Service is responsible for constructing the inputs to various services (e.g. pricer, eligibility) from the current user context and then persisting the outputs of the engine back to the user context. This enables the services to be created independent of the calling context. In the current embodiment, the context service includes an administration UI and schema where the service schema and contextual mappings are defined along with a high performance run-time service to process the mappings.

The service to obtain the context (e.g., "Get Context" service) generates a collection of flattened SDOs based upon the context mappings defined for a context, the context consumer that is to be invoked and a given source entity context. The service uses the variable mappings defined for the context to determine the variable values. The mappings support the following source types: (a) view object (VO) where the VO is used to retrieve, hold or update the information in the database to be viewed; and (b) a service, where the service is invoked to retrieve the values or update the values for the entity. In addition, each attribute can be mapped to either a View Object attribute, a parameter passed to and from a service, an expression or a literal value.

Figure 9A:
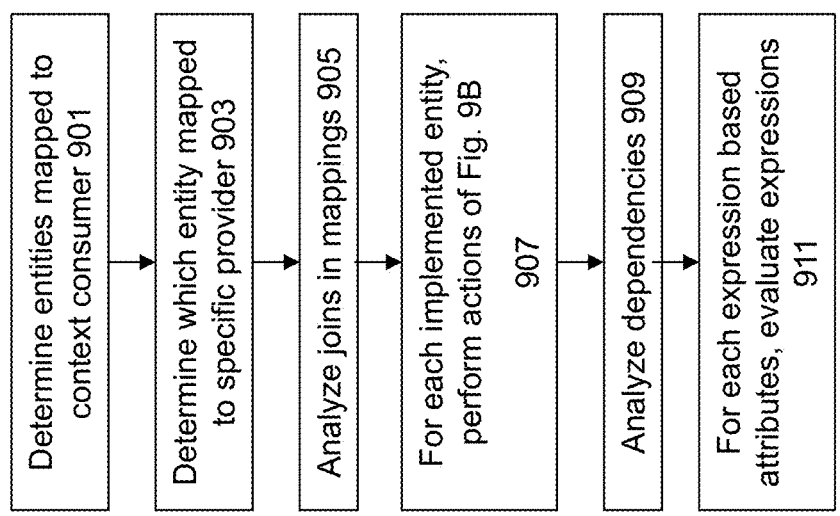
FIGS. 9A-9B illustrate flowcharts of an approach to implement some embodiments of the invention.
Figure 9B:
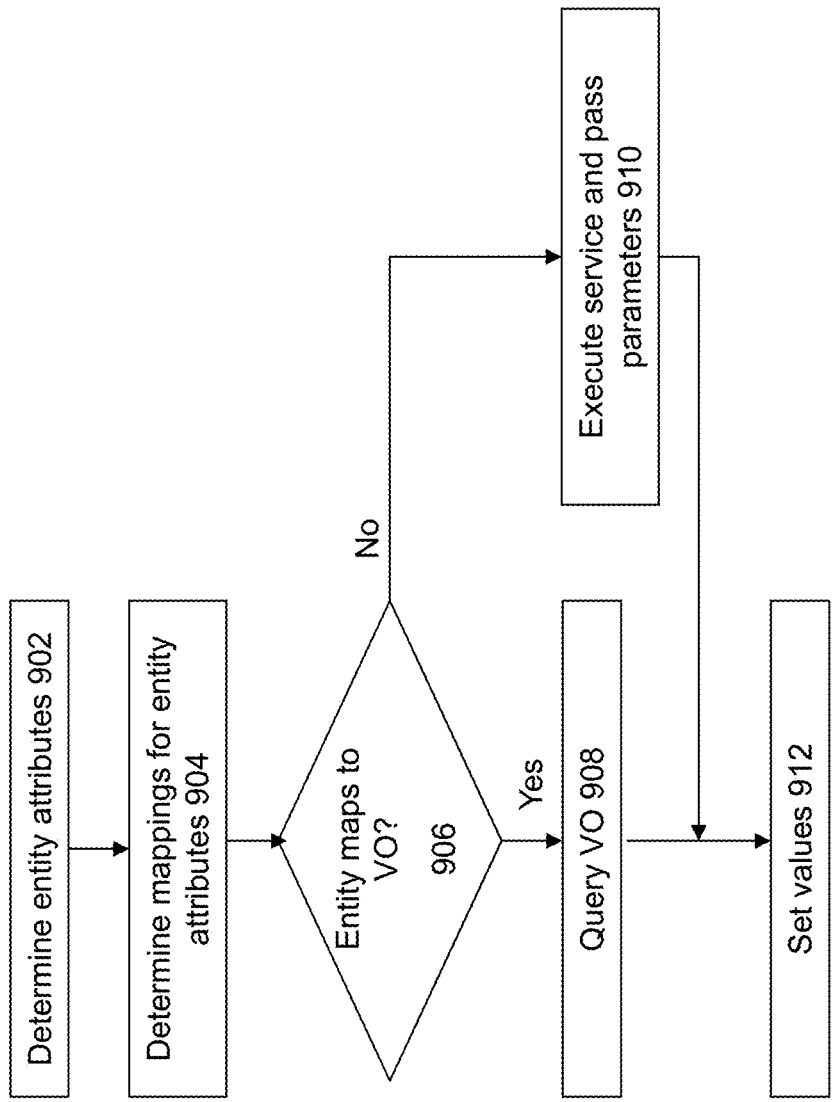

The method to obtain the context determines the entities and attributes it needs to retrieve for the specified context consumer and context provider by executing the approach shown in FIGS. 9A-9B. At 901, a determination is made whether the entities mapped to the context consumer, while taking into account any inheritance that may apply. At 903, a determination is made which of those entities is mapped in the specified context provider. Next, at 905, analysis is performed of the joins specified in the entity mappings to determine the best order in which to query the entities.

For each implemented entity, the actions of FIG. 9B are performed (907). At 902, a determination is made of the entity attributes required by the context consumer. At 904, a determination is made to identify which of those entity attributes are mapped in the current context provider. A check is made at 906 whether the entity maps to a VO. If the entity maps to a VO, then at 908, a query is performed to the VO specified in the entity mapping for the entity attributes mapped in the current context Provider. The query parameters are passed for substitution into the search criteria. If the entity maps to a service, then at 910, the service is executed. The query parameters are then passed as input parameters. At 912, any literal values can then be set.

Returning back to FIG. 9A, the next action at 909 is to analyze the dependencies between expression based attributes to determine any necessary sequencing. For each expression based attribute, expressions are evaluated at 911.

When querying a View Object (VO), only one query can be executed to retrieve all records and attributes using the same VO and search specification. The service analyzes the VO joins required to retrieve the data to determine the sequence in which the queries are executed for a particular context provider. It de-duplicates the search keys before executing queries to minimize the effort required to retrieve the data.

When querying via a service, a single service invocation retrieves all records and attributes with the same service and search specification. The query service can conform to a standard service interface defined by the input and output parameters specified in the mappings.

When an attribute is mapped to an expression, it is possible for the expression to refer to other attributes of the current entity (e.g. [Price List Id]) or attributes of related entities that have a join defined (e.g. [Transaction Header. Document Type]). An error should be raised if a join results in zero or more than one resultant row (e.g. join from [Transaction Line] to [Transaction Header] is acceptable, but a join from [Transaction Header] to [Transaction Line] may result in an error).

The service to obtain a context subschema (e.g., "Get Context Sub Schema" service) takes as an input an existing SDO, presumably one which was created from the context service to being with, and transforms it into an SDO for a separate consumer. The new consumer should be a subset of the consumer which was used to create the original SDO. That is, the service to get the context sub schema will not retrieve new data. For most cases, this means that the consumer from the original Service call to get context will inherit part of its schema from the consumer named in this call to get the context sub schema.

For example, the context consumer for configurator will inherit its schema from pricing engine ("Pricer") and eligibility engine ("Eligibility") so that configuration service ("Configurator") can make calls to Pricer and Eligibility using the same data set that it retrieved from the Sales Order provider. However, the Eligibility call does not need all of the attributes from Pricer and the ones from Configurator. Eligibility only needs a subset of that data and the data that is needed is defined in the Consumer for Eligibility. Therefore, it would be unnecessary to make another call to context service to retrieve data which Configurator already has. By making a call to the service to get the context sub schema, the Configurator can transform the large SDO that was needed for the Configurator call into a smaller one which can be used for the Eligibility call.

A service can be employed to merge context sub-schemas. The purpose of the service is to take the data which was created using the service to get the context sub schema and merge it back into the schema from which is was extracted. In order to accomplish this, the service should know the definitions of the consumers which the SDOs were based upon to begin with. The service can then use these definitions, as well as the very same approaches used by the service to save a context, to add, update and/or delete data from the target schema. This service may accomplish the same functionality as the service to save a context; however, instead of writing the data back to the View Object, it writes it back to an in memory SDO.

For example, the Configurator service called the service to get the context sub schema to create an SDO to send to the eligibility engine. This SDO was a subset of the SDO which was created as an input to start the Configurator service. Once the Eligibility service has been called and it returns the modified SDO, the returned Eligibility SDO needs to be merged back with the target Configurator SDO (not the View Object). This service takes in the Eligibility SDO, the Configurator SDO and the names of the respective consumers which defined how those SDOs were created and merges the eligibility SDO back into the Configurator SDO.

A service can be implemented to expand a schema. The service call to expand the schema is used to take an existing SDO and expand its structure to one that it completely inclusive of the existing SDO structure and includes more structure.

This service could be used in many situations including taking an SDO which was an input to a service and expanding it to an SDO which contains temporary entities and attributes which are only used during the execution of the service.

A service to save a context (e.g., "Save Context" service) persists changes to context data previously created by the method to get a context. It analyzes the input for the context data to determine which entity records have changed. For added, changed or deleted items, it then uses the mappings defined for the context to either write changes back via a VO or call a service to make the updates. Only those entities and attributes that are marked as writable for the context consumer entity and context consumer entity attribute are considered for update. Some entities and attributes (e.g. temporary attributes) will be changed but not persisted. This ensures that a change to a temporary attribute alone does not trigger an update of the record.

Updates to a view object can be consolidated into a single database transaction for performance. Updates via a service can pass all updated records and attributes in a single invocation. Updates and deletes uses the entity attribute identified as the primary key in their "where" clause.

Where a negative primary key is found and a record is new, the context service assigns a real database surrogate key and updates all references to the record in other entities. It does this by checking for entity attributes whose attribute for a referenced entity is the same as the entity being created and whose foreign key attribute value matches the temporary primary key of the new record.

The service to generate a context consumer schema is run at administration time when the integrator is defining or changing the context entities and context consumers. It merges the inherited context consumer schemas with the specified context consumer schema to create a superset XML, schema. That schema is then used to define the interface to the context consumer. This service is used because the SDO schemas are fixed at the time of deployment and should not be weakly typed.

A service can be employed to copy entities. The purpose of the service is to allow for the copying of an object. An object can be copied in the following manners: (a) Entity→Same Entity (e.g. copy a quote); or (b) Entity→Different Entity (e.g. convert an opportunity to a quote).

The mappings that are used will have the flexibilities possessed by the context providers. That is, the entities being copied (e.g., "from" or "to") could be based upon services or view objects. The attributes within those entities can be based upon view object fields, service parameters, expressions and/or literal values.

The copy service handles deep copies of multiple entities which will include the remapping of foreign keys from all parents based upon the parent entity structures defined in the context schema definition.

Illustrative Use Cases

The following is an example use case for adding a new attribute to a pricing application:

1. Integrator interviews company employees to understand desired pricing process and logic.
2. He maps the desired process to the seeded process and identifies differences.
3. He opens CRM Application Composer and edits the "Sales Pricer" service schema:
   a. He compares the attributes seeded in the schema to the attributes required by the customer's pricing logic.
   b. He deletes attributes that are not required to optimize performance.
   c. For missing attributes he checks to see if each attribute is defined in the underlying "Sales Context" schema. If it is then he simply associates the attribute to the "Sales Pricer" service schema.
4. He saves the "Sales Pricer" service schema.
5. He updates the "Sales Pricer" Set Transformation Engine process to use the new attributes.

The following illustrates an alternate scenario. This alternate scenario pertains to the situation where a missing attribute does not already exist in the "Sales Context" schema:

1. User edits the "Sales Context" schema.
2. He edits the "Sales Context" schema.
3. He adds the new attribute to the schema.
4. He defines the mappings to populate that attribute in all of the possible invocation contexts (i.e. Order Line, Order, Opportunity, Sales Agreement, Sales Agreement Line).
5. He saves the "Sales Context" schema.
6. He re-edits the "Sales Pricer" service schema and associates the attribute to it.
7. He saves the "Sales Pricer" service schema.

The following is an example use case for when a CSR (customer service representative) selects the product(s):

1. CSR creates a new sales order for a selected customer
2. He navigates to the catalog and drills into the Desktop PCs category.
3. The catalog service invokes the Context Service's "Get Context" API requesting values for the "Sales Pricer" service schema and the "Product Eligibility" service schema in the "Order" context.
4. The Context Service generates a union of the two requested service schemas. It then uses the "Sales Context" mappings defined for the "Order" context to efficiently query the active Order View Object to construct an SDO containing all the requested attributes.
5. The SDO is returned to the catalog service.
6. The catalog service queries the sales catalog and PIM schemas to generate a list of products for display in the category.
7. The catalog service loads the list of products into a collection within the SDO.
8. The catalog service invokes the eligibility service passing the SDO. The eligibility service uses the contextual data within the SDO to determine product eligibility and to stamp each product as either eligible or not (with a reason).
9. The catalog service invokes the sales pricer service passing the SDO. The sales pricer service uses the contextual data within the SDO to calculate the list price and price to the customer for each product.
10. The catalog service displays the list of products in the category UI with price and eligibility details.
11. The CSR picks the "Dill 6100 Desktop" product and adds it to the order.

Therefore, what has been described is an improved approach for implementing enterprise software systems that provides an effective and efficient approach for defining schemas for services, and to define how to map the schema to particular transactional contexts.

SYSTEM ARCHITECTURE OVERVIEW

Figure 10:
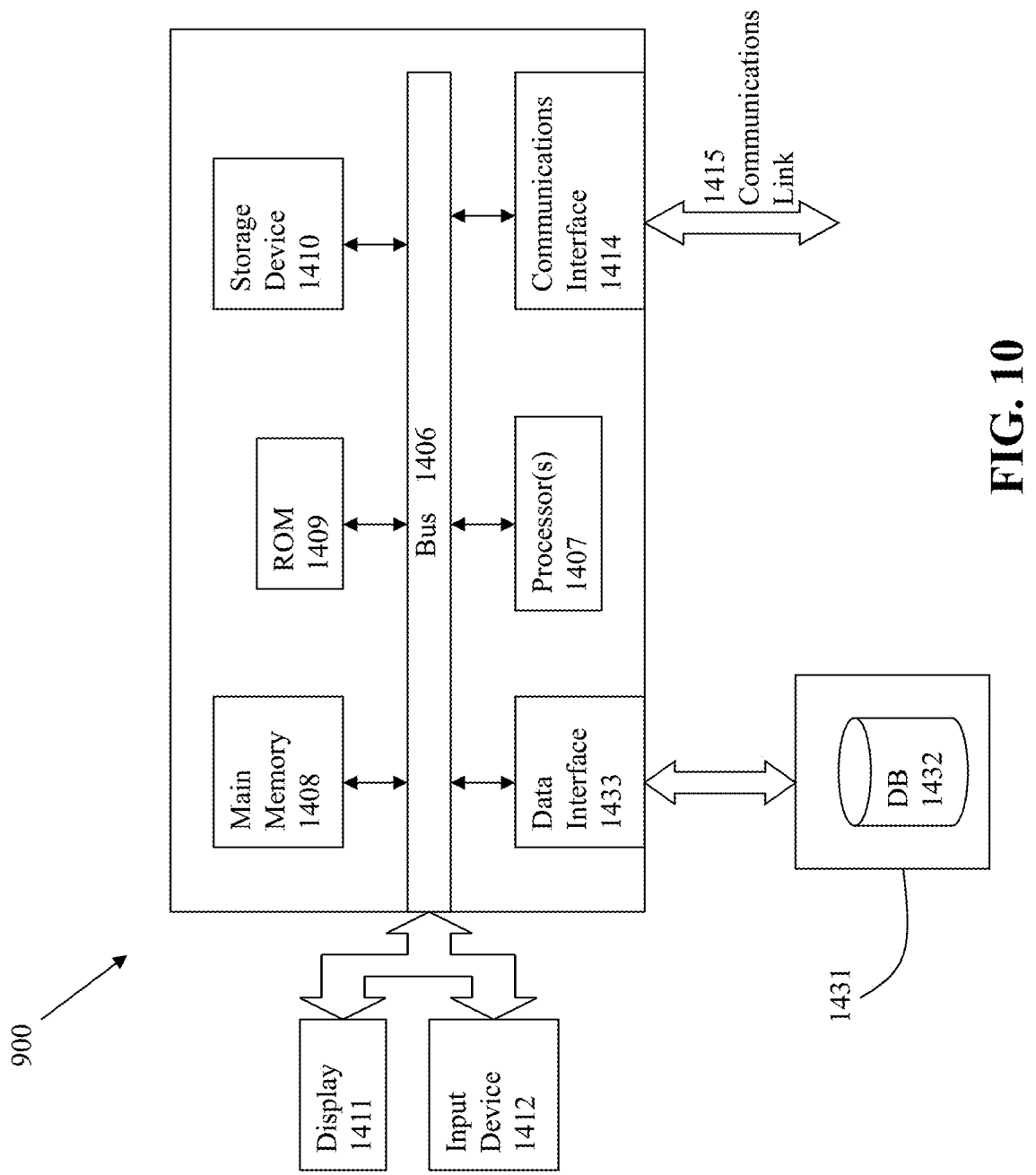
FIG. 10 shows an architecture of an example computing system with which the invention may be implemented.

FIG. 10 is a block diagram of an illustrative computing system 900 suitable for implementing an embodiment of the present invention. Computer system 900 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control. Computer system 900 may connect through a data interface 1433 to a database 1432 on a component 1431.

According to one embodiment of the invention, computer system 900 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 900. According to other embodiments of the invention, two or more computer systems 900 coupled by communication link 1415 (e.g., LAN, PTSN, or wireless network) may perform the sequence of instructions required to practice the invention in coordination with one another.

Computer system 900 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be stored in a database 1432 on a storage medium 1431 which is accessed through data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method implemented with a processor, comprising:
defining a canonical schema that pertains to declarative schema representations for an enterprise application, the canonical schema comprising a set of data objects in a database of general database transaction applicability mappable for a specific database transaction usage;
implementing a user interface to map the canonical schema to a specific database transaction usage;
mapping the canonical schema to the specific database transaction usage through a configuration of user interface portions in the user interface without software code being coded to configure the canonical schema, wherein mapping the canonical schema to the specific database transaction usage comprises:
defining, for the specific database transaction usage, a subset of data objects within the set of data objects in the canonical schema; and
defining, for the specific database transaction usage, how to query and update the subset of data objects in the database; and
using the subset of data objects in the canonical schema as an input of the specific database transaction usage or an output of the specific database transaction usage by:
identifying a group of declarative schema representations to map to the specific database transaction usage;
identifying, for a declarative schema representation from among the group of declarative schema representations, attributes that are required by the specific database transaction usage;
determining a source type for an entity, wherein the source type is a view object or a service; and
upon determination that the source type for the entity is the view object, performing, for the declarative schema representation from among the group of declarative schema representations, a single query to the view object that dedupes search keys before executing the single query, or upon determination that the source type for the entity is the service, executing, for the declarative schema representation from among the group of declarative schema representations, the service conforming to a standard service interface defined by the input or the output of the specific database transaction usage specified in the mappings.

2. The method of claim 1, in which the canonical schema comprises a set of objects for the enterprise application.

3. The method of claim 1, in which the canonical schema is related to the specific database transaction usage by performing mapping or populating.

4. The method of claim 1, in which the specific database transaction usage maps to the view object and a second specific database transaction usage maps to the service.

5. The method of claim 4, in which the user interface defines a layer of abstraction over the canonical schema.

6. The method of claim 1, wherein the method is applied to a quote and capture service.

7. The method of claim 6, in which a service schema is edited to include add, remove, or edit attributes, where the add, remove, or edit attributes are defined in another schema.

8. The method of claim 7, in which contextual data is used to process the service schema.

9. The method of claim 1, in which a logic engine operates upon the canonical schema without being specifically programmed to do so.

10. A computer program product embodied in a non-transitory computer readable medium having stored thereon a sequence of instructions which, when executed by a processor causes a set of acts comprising:
defining a canonical schema that pertains to declarative schema representations for an enterprise application, the canonical schema comprising a set of data objects in a database of general database transaction applicability mappable for a specific database transaction usage;
implementing a user interface to map the canonical schema to a specific database transaction usage;
mapping the canonical schema to the specific database transaction usage through a configuration of user interface portions in the user interface without software code being coded to configure the canonical schema, wherein mapping the canonical schema to the specific database transaction usage comprises:
defining, for the specific database transaction usage, a subset of data objects within the set of data objects in the canonical schema; and
defining, for the specific database transaction usage, how to query and update the subset of data objects in the database; and
using the subset of data objects in the canonical schema as an input of the specific database transaction usage or an output of the specific database transaction usage by:
identifying a group of declarative schema representations to map to the specific database transaction usage;
identifying, for a declarative schema representation from among the group of declarative schema representations, attributes that are required by the specific database transaction usage;
determining a source type for an entity, wherein the source type is a view object or a service; and
upon determination that the source type for the entity is the view object, performing, for the declarative schema representation from among the group of declarative schema representations, a single query to the view object that dedupes search keys before executing the single query, or upon determination that the source type for the entity is the service, executing, for the declarative schema representation from among the group of declarative schema representations, the service conforming to a standard service interface defined by the input or the output of the specific database transaction usage specified in the mappings.

11. The computer program product of claim 10, in which the canonical schema comprises a set of objects for the enterprise application.

12. The computer program product of claim 10, in which the canonical schema is related to the specific database transaction usage by performing mapping or populating.

13. The computer program product of claim 10, in which the specific database transaction usage maps to the view object and a second specific database transaction usage maps to the service.

14. The computer program product of claim 13, in which the user interface defines a layer of abstraction over the canonical schema.

15. The computer program product of claim 10, wherein the set of acts are applied to a capture service for a CRM application.

16. The computer program product of claim 15, in which a service schema is edited to include add, remove, or edit attributes, where the add, remove, or edit attributes are defined in another schema.

17. The computer program product of claim 16, in which contextual data is used to process the service schema.

18. The computer program product of claim 10, in which a logic engine operates upon the canonical schema without being specifically programmed to do so.

19. A system, comprising:
- a processor; and
- a memory comprising computer code executed using the processor, in which the computer code implements:
  - defining a canonical schema that pertains to declarative schema representations for an enterprise application, the canonical schema comprising a set of data objects in a database of general database transaction applicability mappable for a specific database transaction usage;
  - implementing a user interface to map the canonical schema to a specific database transaction usage;
  - mapping the canonical schema to the specific database transaction usage through a configuration of user interface portions in the user interface without software code being coded to configure the canonical schema, wherein mapping the canonical schema to the specific database transaction usage comprises:
    - defining, for the specific database transaction usage, a subset of data objects within the set of data objects in the canonical schema; and
    - defining, for the specific database transaction usage, how to query and update the subset of data objects in the database; and
  - using the subset of data objects in the canonical schema as an input of the specific database transaction usage or an output of the specific database transaction usage by:
    - identifying a group of declarative schema representations to map to the specific database transaction usage;
    - identifying, for a declarative schema representation from among the group of declarative schema representations, attributes that are required by the specific database transaction usage;
    - determining a source type for an entity, wherein the source type is a view object or a service; and
    - upon determination that the source type for the entity is the view object, performing, for the declarative schema representation from among the group of declarative schema representations, a single query to the view object that dedupes search keys before executing the single query, or upon determination that the source type for the entity is the service, executing, for the declarative schema representation from among the group of declarative schema representations, the service conforming to a standard service interface defined by the input or the output of the specific database transaction usage specified in the mappings.

20. The system of claim 19, in which the canonical schema comprises a set of objects for the enterprise application.

21. The system of claim 19, in which the canonical schema is related to the specific database transaction usage by performing mapping or populating.

22. The system of claim 19, in which the specific database transaction usage maps to the view object and a second specific database transaction usage maps to the service.

23. The system of claim 22, in which the user interface defines a layer of abstraction over the canonical schema.

24. The system of claim 19, wherein the computing code implemented by the processor is applied to a capture service for a CRM application.

25. The system of claim 24, in which a service schema is edited to include add, remove, or edit attributes, where the add, remove, or edit attributes are defined in another schema.

26. The system of claim 25, in which contextual data is used to process the service schema.

27. The system of claim 19, in which a logic engine operates upon the canonical schema without being specifically programmed to do so.

* * * * *

UNITED STATES PATENT AND TRADEMARK OFFICE
CERTIFICATE OF CORRECTION

| | | |
|---|---|---|
| PATENT NO. | : 11,526,895 B2 | Page 1 of 1 |
| APPLICATION NO. | : 16/266337 | |
| DATED | : December 13, 2022 | |
| INVENTOR(S) | : Lewis et al. | |

It is certified that error appears in the above-identified patent and that said Letters Patent is hereby corrected as shown below:

On the Title Page

Column 1, under Assignee, Line 2, delete "CORPORATION" and insert -- CORPORATION, Redwood Shores, CA (US) --, therefor.

In the Specification

In Column 8, Line 10, delete "input/outputs." and insert -- input/output. --, therefor.

In Column 10, Line 44, delete "XML," and insert -- XML --, therefor.

In Column 11, Line 37, after "customer" insert -- . --.

Signed and Sealed this
Eighth Day of August, 2023

Katherine Kelly Vidal
*Director of the United States Patent and Trademark Office*